(12) United States Patent
Kawashima et al.

(10) Patent No.: US 8,940,439 B2
(45) Date of Patent: Jan. 27, 2015

(54) SECONDARY BATTERY, ELECTRONIC DEVICE, ELECTRIC POWER TOOL, ELECTRICAL VEHICLE, AND ELECTRIC POWER STORAGE SYSTEM

(75) Inventors: Atsumichi Kawashima, Fukushima (JP); Hiroshi Imoto, Fukushima (JP); Tomoyuki Shiratsuchi, Fukushima (JP); Takuma Sakamoto, Fukushima (JP); Naoto Ueda, Fukushima (JP); Atsushi Nishimoto, Fukushima (JP); Tadahiko Kubota, Kanagawa (JP); Masayuki Ihara, Fukushima (JP)

(73) Assignee: Sony Corporation (JP)

( * ) Notice: Subject to any disclaimer, the term of this patent is extended or adjusted under 35 U.S.C. 154(b) by 485 days.

(21) Appl. No.: 13/421,130

(22) Filed: Mar. 15, 2012

(65) Prior Publication Data
US 2012/0244410 A1 Sep. 27, 2012

(30) Foreign Application Priority Data
Mar. 23, 2011 (JP) .................................. 2011-063617

(51) Int. Cl.
*H01M 10/052* (2010.01)
*H01M 10/0567* (2010.01)
*H01M 4/485* (2010.01)
*H01M 2/16* (2006.01)
*H01M 10/0525* (2010.01)
*H01M 10/0569* (2010.01)

(52) U.S. Cl.
CPC ............ *H01M 10/052* (2013.01); *H01M 4/485* (2013.01); *H01M 10/0567* (2013.01); *H01M 2/1653* (2013.01); *H01M 2/1686* (2013.01); *H01M 10/0525* (2013.01); *H01M 10/0569* (2013.01); *Y02E 60/122* (2013.01); *Y02T 10/7011* (2013.01)
USPC ......... 429/231.5; 429/329; 429/340; 429/346

(58) Field of Classification Search
CPC  H01M 10/052; H01M 10/0567; H01M 4/485
USPC ............................... 429/231.5, 329, 340, 346
See application file for complete search history.

(56) References Cited

U.S. PATENT DOCUMENTS

2006/0286459 A1 12/2006 Zhao et al.
2008/0096112 A1 4/2008 Ihara et al.
(Continued)

FOREIGN PATENT DOCUMENTS

EP          1 394 888       3/2004
JP          06-275263       9/1994
(Continued)

OTHER PUBLICATIONS

European Search Report issued on Jul. 3, 2012, in connection with counterpart EP Application No. 12 00 1668.

*Primary Examiner* — Tracy Dove
(74) *Attorney, Agent, or Firm* — Sheridan Ross P.C.

(57) ABSTRACT

A secondary battery capable of suppressing resistance rise even after repeated charge and discharge is provided. The secondary battery includes a cathode, an anode, and an electrolytic solution. The anode contains titanium-containing lithium composite as an anode active material, and the electrolytic solution contains cyclic disulfonic acid anhydride.

13 Claims, 4 Drawing Sheets

(56) References Cited

U.S. PATENT DOCUMENTS

2010/0216017 A1 8/2010 Saito et al.
2012/0301786 A1* 11/2012 Takamuku et al. ........... 429/223

FOREIGN PATENT DOCUMENTS

JP 2004-022336 1/2004
JP 2011-049153 3/2011

* cited by examiner

SECONDARY BATTERY, ELECTRONIC DEVICE, ELECTRIC POWER TOOL, ELECTRICAL VEHICLE, AND ELECTRIC POWER STORAGE SYSTEM

BACKGROUND

The present technology relates to secondary batteries including a cathode, an anode, and an electrolytic solution, electronic devices using the same, electric power tools using the same, electrical vehicles using the same, and electric power storage systems using the same.

In recent years, electronic devices represented by a mobile phone and a Personal Digital Assistant (PDA) have been widely used, and it has been strongly demanded to further reduce their size and weight and to achieve their long life. Accordingly, as a power source for the electronic devices, a battery, in particular, a small and light-weight secondary battery capable of providing a high energy density has been developed. In recent years, it has been considered to apply such a secondary battery not only to the foregoing electronic devices but also to various applications represented by an electric power tool such as an electrical drill, an electrical vehicle such as an electrical automobile, and an electric power storage system such as a home electrical power server.

As the secondary batteries, secondary batteries using various charge and discharge principles have been widely proposed. Specially, lithium ion secondary batteries using insertion and extraction of lithium ions are considered promising, since the lithium ion secondary batteries are able to provide a higher energy density than that of lead batteries, nickel cadmium batteries and the like.

The secondary batteries include a cathode, an anode, and an electrolytic solution. The cathode and the anode respectively contain a cathode active material and an anode active material that insert and extract lithium ions. In the secondary battery, in order to obtain a high battery capacity, a lithium-containing compound such as $LiCoO_2$ is used as a cathode active material, and a carbon material such as graphite is used as an anode active material.

In the secondary battery using the carbon material as an anode active material, the anode active material is easily reacted with an electrolytic solution at the time of charge and discharge, and therefore decomposition reaction of the electrolytic solution tends to be promoted. In this case, since the surface of the anode is covered with a decomposed matter or the like of the electrolytic solution. Therefore, when charge and discharge are repeated, resistance of the anode is easily increased.

Therefore, it has been proposed to use, as an anode active material, a low reactive titanium-containing lithium composite oxide instead of the high reactive carbon material (for example, see Japanese Unexamined Patent Application Publication No. 06-275263). The titanium-containing lithium composite oxide is an oxide containing Li, Ti, and other metal element as an element, and has a spinel type crystal structure.

SUMMARY

By using the titanium-containing lithium composite oxide as an anode active material, decomposition reaction of the electrolytic solution resulting from reactivity of the anode is inhibited. However, in this case, decomposition reaction of the electrolytic solution resulting from reactivity of the cathode is not inhibited. Therefore, in the case where the lithium-containing compound providing a high capacity is used as a cathode active material, after repeated charge and discharge, resistance of the cathode is easily increased resulting from decomposition reaction of the electrolytic solution. Accordingly, resistance of the entire battery is still increased.

It is desirable to provide a secondary battery, an electronic device, an electric power tool, an electrical vehicle, and an electric power storage system capable of suppressing resistance rise even after repeated charge and discharge.

According to an embodiment of the present technology, there is provided a secondary battery including a cathode, an anode, and an electrolytic solution. The anode contains one or more of titanium-containing lithium composite oxides expressed by the following Formula 1 to Formula 3 as an anode active material. The electrolytic solution contains one cyclic disulfonic acid anhydride expressed by the following Formula 4 or cyclic disulfonic acid anhydride expressed by the following Formula 5 or both.

Formula 1

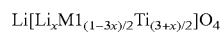

$$Li[Li_xM1_{(1-3x)/2}Ti_{(3+x)/2}]O_4 \qquad (1)$$

In the formula, M1 is one or more of Mg, Ca, Cu, Zn, and Sr, and x satisfies $0 \leq x \leq 1/3$.

Formula 2

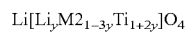

$$Li[Li_yM2_{1-3y}Ti_{1+2y}]O_4 \qquad (2)$$

In the formula, M2 is one or more of Al, Sc, Cr, Mn, Fe, Ga, and Y, and y satisfies $0 \leq y \leq 1/3$.

Formula 3

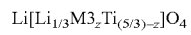

$$Li[Li_{1/3}M3_zTi_{(5/3)-z}]O_4 \qquad (3)$$

In the formula, M3 is one or more of V, Zr, and Nb, and z satisfies $0 \leq z \leq 2/3$.

Formula 4

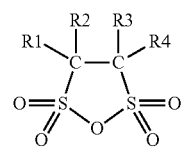

(4)

In the formula, R1 to R4 are an alkyl group ($C_mH_{2m+1}$: m satisfies $0 \leq m \leq 4$).

Formula 5

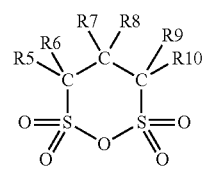

(5)

In the formula, R5 to R10 are an alkyl group ($C_nH_{2n+1}$: n satisfies $0 \leq n \leq 4$).

According to an embodiment of the present technology, there is provided an electronic device using the secondary battery of the embodiment of the present technology.

According to an embodiment of the present technology, there is provided an electric power tool using the secondary battery of the embodiment of the present technology.

According to an embodiment of the present technology, there is provided an electrical vehicle using the secondary battery of the embodiment of the present technology.

According to an embodiment of the present technology, there is provided an electric power storage system using the secondary battery of the embodiment of the present technology.

According to the secondary battery of the embodiment of the present technology, the anode contains the foregoing titanium-containing lithium composite oxide as an anode active material, and the electrolytic solution contains the foregoing cyclic disulfonic acid anhydride. Therefore, even if charge and discharge are repeated, resistance rise is allowed to be suppressed. Further, in the electronic device, the electric power tool, the electrical vehicle, and the electric power storage system of the embodiment of the present technology using the foregoing secondary battery, similar effect is obtained.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present technology, and are incorporated in and constitute a part of this specification. The drawings illustrate embodiments and, together with the specification, serve to explain the principles of the technology.

DETAILED DESCRIPTION

An embodiment of the present technology will be hereinafter described in detail with reference to the drawings. The description will be given in the following order.
1. Secondary Battery
1-1. Cylindrical Type
1-2. Laminated Film Type
2. Applications of Secondary Battery
<1. Secondary Battery/1-1. Cylindrical Type>

Figure 1:
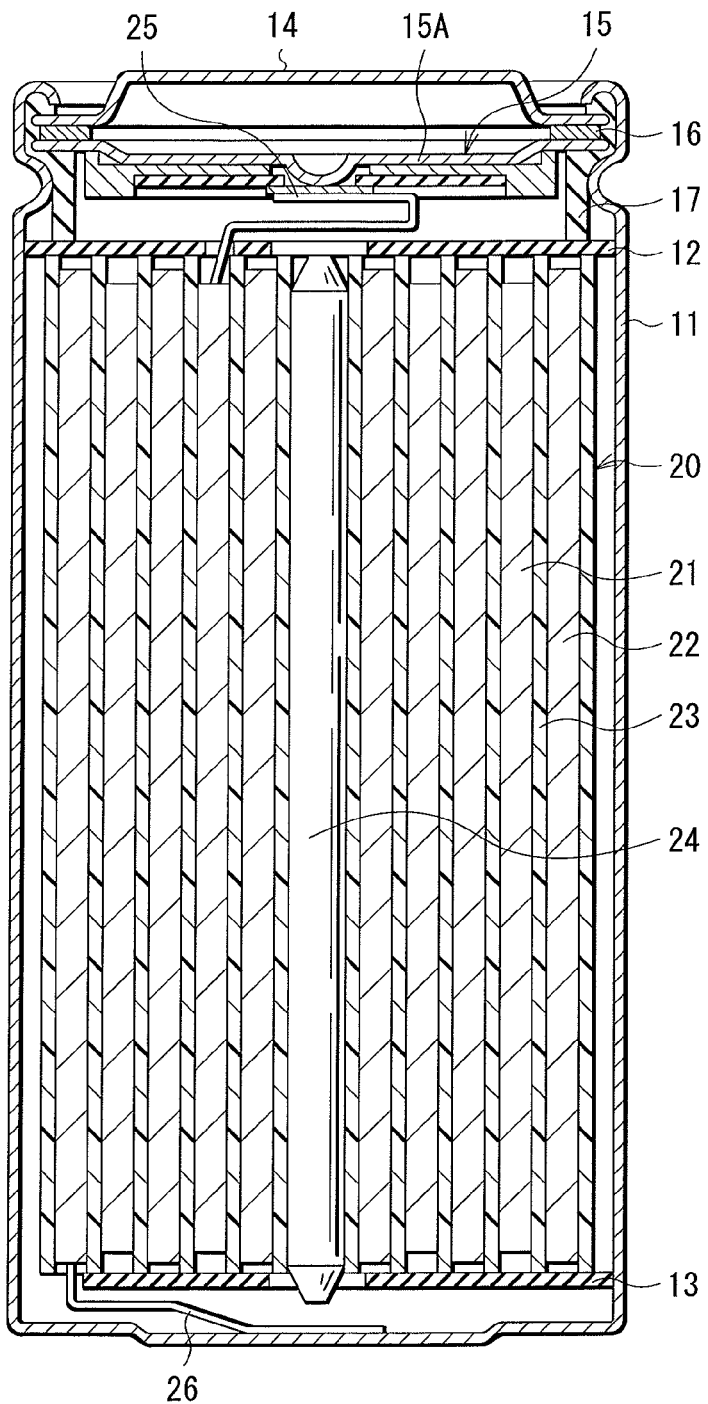
FIG. 1 is a cross sectional view illustrating a configuration of a secondary battery (cylindrical type) of an embodiment of the present technology.
Figure 2:
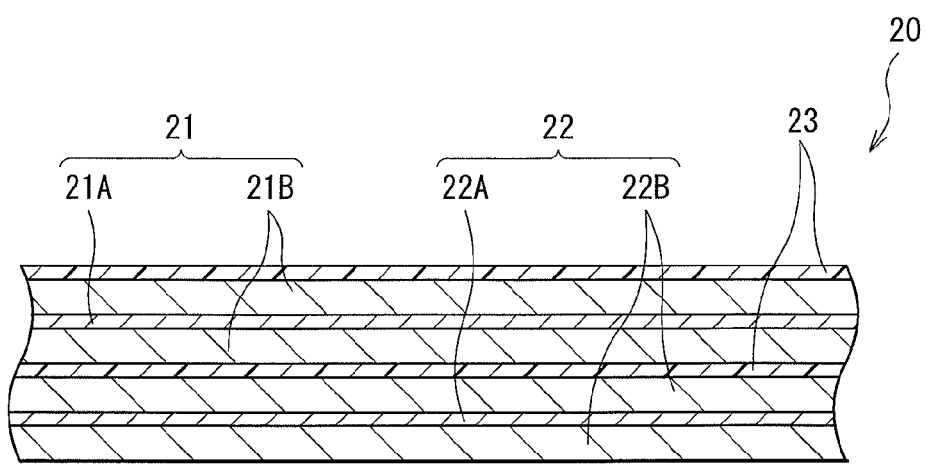
FIG. 2 is a cross sectional view illustrating an enlarged part of the spirally wound electrode body illustrated in FIG. 1.

FIG. 1 and FIG. 2 illustrate a cross sectional configuration of a secondary battery in the embodiment of this technology. FIG. 2 illustrates an enlarged part of a spirally wound electrode body 20 illustrated in FIG. 1.
[Whole Configuration of Secondary Battery]

The secondary battery herein described is, for example, a lithium ion secondary battery in which the battery capacity is obtained by insertion and extraction of lithium ions, and is what we call a cylindrical type secondary battery. The secondary battery contains the spirally wound electrode body 20 and a pair of insulating plates 12 and 13 inside a battery can 11 in the shape of an approximately hollow cylinder. In the spirally wound electrode body 20, a cathode 21 and an anode 22 are layered with a separator 23 in between and are spirally wound.

The battery can 11 has a hollow structure in which one end of the battery can 11 is closed and the other end thereof is opened. The battery can 11 is made of, for example, Fe, Al, an alloy thereof or the like. Plating of Ni or the like may be provided on the surface of the battery can 11. The pair of insulating plates 12 and 13 is arranged to sandwich the spirally wound electrode body 20 in between from the upper and the lower sides, and to extend perpendicularly to the spirally wound periphery face.

At the open end of the battery can 11, a battery cover 14, a safety valve mechanism 15, and a PTC (Positive Temperature Coefficient) device 16 are attached by being caulked with a gasket 17. Thereby, the battery can 11 is hermetically sealed. The battery cover 14 is made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, when the internal pressure becomes a certain level or more by internal short circuit, external heating or the like, a disk plate 15A inverts to cut the electric connection between the battery cover 14 and the spirally wound electrode body 20. The PTC device 16 prevents abnormal heat generation resulting from a large current. In the PTC device 16, as temperature rises, the resistance is increased. The gasket 17 is made of, for example, an insulating material. The surface of the gasket 17 may be coated with asphalt.

In the center of the spirally wound electrode body 20, a center pin 24 may be inserted. For example, a cathode lead 25 made of a conductive material such as Al is connected to the cathode 21. For example, an anode lead 26 made of a conductive material such as Ni is connected to the anode 22. The cathode lead 25 is, for example, welded to the safety valve mechanism 15, and is electrically connected to the battery cover 14. The anode lead 26 is, for example, welded to the battery can 11, and is electrically connected to the battery can 11.
[Cathode]

In the cathode 21, for example, a cathode active material layer 21B is provided on a single face or both faces of a cathode current collector 21A. The cathode current collector 21A is made of, for example, a conductive material such as Al, Ni, and stainless steel.

The cathode active material layer 21B contains, as a cathode active material, one or more cathode materials inserting and extracting lithium ions. According to needs, the cathode active material layer 21B may contain other material such as a cathode binder and a cathode electrical conductor.

As the cathode material, a lithium-containing compound is preferable, since thereby a high energy density is obtained. Examples of the lithium-containing compound include a composite oxide containing Li and a transition metal element as an element and a phosphate compound containing Li and a transition metal element as an element. Specially, it is preferable that the transition metal element be one or more of Co, Ni, Mn, and Fe, since thereby a higher voltage is obtained. The chemical formula thereof is expressed by, for example, $Li_xMIO_2$ or $Li_yMIIPO_4$. In the formula, MI and MII represent one or more transition metal elements. Values of x and y vary according to the charge and discharge state, and are generally in the range of $0.05 \leq x \leq 1.10$ and $0.05 \leq y \leq 1.10$.

Examples of the composite oxide containing Li and a transition metal element include $Li_xCoO_2$, $Li_xNiO_2$, $LiMn_2O_4$, and a lithium-nickel composite oxide expressed by the following Formula 20. Examples of the phosphate compound containing Li and a transition metal element include LiFePO$_4$ and LiFe$_{1-u}$Mn$_u$PO$_4$(u<1), since thereby a high battery capacity is obtained and superior cycle characteristics are able to be obtained. As a cathode material, a material other than the foregoing materials may be used.

Formula 20

$$LiNi_{1-x}M_xO_2 \qquad (20)$$

In the formula, M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. x is in the range of 0.005<x<0.5.

In addition, the cathode material may be, for example, an oxide, a disulfide, a chalcogenide, a conductive polymer or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

The cathode binder contains, for example, one or more of a synthetic rubber, a polymer material and the like. Examples of the synthetic rubber include styrene butadiene rubber, fluorinated rubber, and ethylene propylene diene. Examples of the polymer material include polyvinylidene fluoride and polyimide.

The cathode electrical conductor contains, for example, one or more of carbon materials and the like. Examples of the carbon materials include graphite, carbon black, acetylene black, and Ketjen black. The cathode electrical conductor may be a metal material, a conductive polymer or the like as long as the material has the electric conductivity.

[Anode]

In the anode 22, for example, an anode active material layer 22B is provided on a single face or both faces of an anode current collector 22A.

The anode current collector 22A is made of, for example, a conductive material such as Cu, Ni, and stainless steel. The surface of the anode current collector 22A is preferably roughened. Thereby, due to what we call anchor effect, the contact characteristics between the anode current collector 22A and the anode active material layer 22B are improved. In this case, it is enough that the surface of the anode current collector 22A in the region opposed to the anode active material layer 22B is roughened. Examples of roughening methods include a method of forming fine particles by electrolytic treatment. The electrolytic treatment is a method of providing concavity and convexity by forming fine particles on the surface of the anode current collector 22A by electrolytic method in an electrolytic bath. A copper foil formed by electrolytic method is generally called "electrolytic copper foil."

The anode active material layer 22B contains one or more anode materials inserting and extracting lithium ions as an anode active material, and may also contain other material such as an anode binder and an anode electrical conductor according to needs. Details of the anode binder and the anode electrical conductor are, for example, respectively similar to those of the cathode binder and the cathode electrical conductor. In the anode active material layer 22B, for example, the chargeable capacity of the anode material is preferably larger than the discharge capacity of the cathode 21 in order to prevent unintentional precipitation of lithium metal at the time of charge and discharge.

The anode material is one or more of titanium-containing lithium composite oxides expressed by the following Formula 1 to Formula 3 (hereinafter simply referred to as "titanium-containing lithium composite oxide" as well). The titanium-containing lithium composite oxide is electrochemically stable (low-reactive) more than carbon materials (for example, graphite or the like), and therefore decomposition reaction of the electrolytic solution resulting from reactivity of the anode 22 is thereby inhibited. Accordingly, even if charge and discharge are repeated, resistance of the anode 22 is less likely to be increased.

Formula 1

$$Li[Li_xM1_{(1-3)/2}Ti_{(3+x)/2}]O_4 \qquad (1)$$

In the formula, M1 is one or more of Mg, Ca, Cu, Zn, and Sr, and x satisfies 0≤x≤⅓.

Formula 2

$$Li[Li_yM2_{1-3y}Ti_{1+2y}]O_4 \qquad (2)$$

In the formula, M2 is one or more of Al, Sc, Cr, Mn, Fe, Ga, and Y, and y satisfies 0≤y≤⅓.

Formula 3

$$Li[Li_{1/3}M3_zTi_{(5/3)-z}]O_4 \qquad (3)$$

In the formula, M3 is one or more of V, Zr, and Nb, and z satisfies 0≤z≤⅔.

The titanium-containing lithium composite oxide is an oxide that contains Li, Ti, and one or more other metal elements as an element, and has a spinel type crystal structure. M1 in Formula 1 represents a metal element capable of becoming a bivalent ion, M2 in Formula 2 represents a metal element capable of becoming a trivalent ion, and M3 in Formula 3 represents a metal element capable of becoming a tetravalent ion.

The titanium-containing lithium composite oxide shown in Formula 1 is not particularly limited as long as the conditions of the chemical formula shown in Formula 1 are satisfied, and is, for example, Li$_{3.75}$Ti$_{4.875}$Mg$_{0.375}$O$_{12}$ or the like. The titanium-containing lithium composite oxide shown in Formula 2 is not particularly limited as long as the conditions of the chemical formula shown in Formula 2 are satisfied, and is, for example, LiCrTiO$_4$ or the like. The titanium-containing lithium composite oxide shown in Formula 3 is not particularly limited as long as the conditions of the chemical formula shown in Formula 3 are satisfied, and is, for example, Li$_4$Ti$_5$O$_{12}$, Li$_4$Ti$_{4.95}$Nb$_{0.05}$O$_{12}$ or the like.

The titanium-containing lithium composite oxide may be coated with carbon. To this end, for example, a carbon membrane may be grown on the surface of the titanium-containing lithium composite oxide by decomposing carbon hydride or the like with the use of Chemical Vapor Deposition (CVD) method or the like.

The anode material may be a mixture of the titanium-containing lithium composite oxide and one or more other materials. Examples of such other materials include a carbon material. In the carbon material, crystal structure change at the time of insertion and extraction of lithium ions is extremely small. Therefore, the carbon material provides a high energy density and superior cycle characteristics. Further, the carbon material functions as an anode electrical conductor as well. Examples of the carbon material include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material include pyrolytic carbon, coke, glassy carbon fiber, an organic polymer compound fired body, activated carbon, and carbon black. Of the foregoing, the coke includes pitch coke, needle coke, and petroleum coke. The organic polymer compound fired body is obtained by firing (carbonizing) a polymer compound such as a phenol resin and a furan resin at appropriate temperature. In addition, the carbon material may be a low crystalline carbon or amorphous carbon provided with heat treatment at equal to or lower than about 1000 deg C. The shape of the carbon material may be any of a fibrous shape, a spherical shape, a granular shape, and a scale-like shape.

Further, examples of other materials include a material (metal material) having one or more of metal elements and metalloid elements as an element, since a high energy density is thereby obtained. Such a metal material may be a simple substance, an alloy, or a compound of a metal element or a metalloid element, may be two or more thereof, or may have one or more phases thereof at least in part. "Alloy" includes a material containing one or more metal elements and one or more metalloid elements, in addition to a material composed of two or more metal elements. The alloy may contain a nonmetallic element. The structure thereof includes a solid solution, a eutectic crystal (eutectic mixture), an intermetallic compound, and a structure in which two or more thereof coexist.

The foregoing metal element or the foregoing metalloid element is a metal element or a metalloid element capable of forming an alloy with lithium. Specifically, the foregoing metal element or the foregoing metalloid element is one or more of Mg, B, Al, Ga, In, Si, Ge, Sn, Pb, Bi, Cd, Ag, Zn, Hf, Zr, Y, Pd, and Pt. Specially, Si or Sn or both are preferably used. Si and Sn have the high ability to insert and extract lithium ions, and therefore are able to provide a high energy density.

A material containing Si or Sn or both may be, for example, a simple substance, an alloy, or a compound of Si or Sn; two or more thereof; or a material having one or more phases thereof at least in part. The simple substance only means a general simple substance (a small amount of impurity may be therein contained), and does not necessarily mean a purity 100% simple substance.

Examples of alloys of Si include a material containing one or more of the following elements as an element other than Si. Such an element is Sn, Ni, Cu, Fe, Co, Mn, Zn, In, Ag, Ti, Ge, Bi, Sb, or Cr. Examples of compounds of Si include a compound containing C or O as an element other than Si. The compounds of Si may contain one or more of the elements described for the alloys of Si as an element other than Si.

Examples of alloys or compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq 2$), and LiSiO. v in $SiO_v$ may be $0.2<v<1.4$.

Examples of alloys of Sn include a material containing one or more of the following elements as an element other than Sn. Such an element is Si, Ni, Cu, Fe, Co, Mn, Zn, In, Ag, Ti, Ge, Bi, Sb or Cr. Examples of compounds of Sn include a material containing C or O as an element. The compounds of Sn may contain one or more elements described for the alloys of Sn as an element other than Sn. Examples of alloys or compounds of Sn include $SnO_w$ ($0<w\leq 2$), $SnSiO_3$, $LiSnO$, and $Mg_2Sn$.

Further, as a material containing Sn, for example, a material containing a second element and a third element in addition to Sn as a first element is preferable. The second element is, for example, one or more of the following elements. That is, the second element is one or more of Co, Fe, Mg, Ti, V, Cr, Mn, Ni, Cu, Zn, Ga, Zr, Nb, Mo, Ag, In, Ce, Hf, Ta, W, Bi, and Si. The third element is, for example, one or more of B, C, Al, and P. In the case where the second element and the third element are contained, a high battery capacity, superior cycle characteristics and the like are obtained.

Specially, a material containing Sn, Co, and C (SnCoC-containing material) is preferable. As the composition of the SnCoC-containing material, for example, the C content is from 9.9 wt % to 29.7 wt % both inclusive, and the ratio of Sn and Co contents (Co/(Sn+Co)) is from 20 wt % to 70 wt % both inclusive, since a high energy density is obtained in such a composition range.

It is preferable that the SnCoC-containing material have a phase containing Sn, Co, and C. Such a phase preferably has a low crystallinity or an amorphous. The phase is a reaction phase capable of being reacted with Li. Due to existence of the reaction phase, superior characteristics are obtained. The half-width of the diffraction peak obtained by X-ray diffraction of the phase is preferably equal to or greater than 1.0 deg based on diffraction angle of 2θ in the case where CuKα ray is used as a specific X ray, and the trace speed is 1 deg/min. Thereby, lithium ions are more smoothly inserted and extracted, and reactivity with the electrolytic solution is decreased. In some cases, the SnCoC-containing material has a phase containing a simple substance or part of the respective elements in addition to the low crystalline or amorphous phase.

Whether or not the diffraction peak obtained by X-ray diffraction corresponds to the reaction phase capable of being reacted with Li is able to be easily determined by comparison between X-ray diffraction charts before and after electrochemical reaction with Li. For example, if the position of the diffraction peak after electrochemical reaction with Li is changed from the position of the diffraction peak before electrochemical reaction with Li, the obtained diffraction peak corresponds to the reaction phase capable of being reacted with Li. In this case, for example, the diffraction peak of the low crystalline or amorphous reaction phase is shown in the range of 2θ=from 20 to 50 deg both inclusive. Such a reaction phase has, for example, the foregoing respective elements, and the low crystalline or amorphous may result from existence of C.

In the SnCoC-containing material, at least part of C as an element is preferably bonded to a metal element or a metalloid element as other element, since thereby cohesion or crystallization of Sn or the like is suppressed. The bonding state of elements is able to be checked by, for example, X-ray Photoelectron Spectroscopy (XPS). In a commercially available apparatus, for example, as a soft X ray, Al—Kα ray, Mg—Kα ray or the like is used. In the case where at least part of C is bonded to a metal element, a metalloid element or the like, the peak of a synthetic wave of 1s orbit of C (C1s) is shown in a region lower than 284.5 eV. In the apparatus, energy calibration is made so that the peak of 4f orbit of Au atom (Au4f) is obtained at 84.0 eV. At this time, in general, since surface contamination carbon exists on the material surface, the peak of C1s of the surface contamination carbon is regarded as 284.8 eV, which is used as the energy reference. In XPS measurement, the waveform of the peak of C1s is obtained as a form including the peak of the surface contamination carbon and the peak of C in the SnCoC-containing material. Therefore, for example, analysis is made by using commercially available software to isolate both peaks from each other. In the waveform analysis, the position of a main peak existing on the lowest bound energy side is the energy reference (284.8 eV).

The SnCoC-containing material may further contain other elements according to needs. Examples of other elements include one or more of Si, Fe, Ni, Cr, In, Nb, Ge, Ti, Mo, Al, P, Ga, and Bi.

In addition to the SnCoC-containing material, a material containing Sn, Co, Fe, and C (SnCoFeC-containing material) is also preferable. The composition of the SnCoFeC-containing material is allowed to be arbitrarily set. For example, a composition in which the Fe content is set small is as follows. That is, the C content is from 9.9 wt % to 29.7 wt % both inclusive, the Fe content is from 0.3 wt % to 5.9 wt % both inclusive, and the ratio of contents of Sn and Co (Co/(Sn+Co)) is from 30 wt % to 70 wt % both inclusive. Further, for example, a composition in which the Fe content is set large is as follows. That is, the C content is from 11.9 wt % to 29.7 wt % both inclusive, the ratio of contents of Sn, Co, and Fe ((Co+Fe)/(Sn+Co+Fe)) is from 26.4 wt % to 48.5 wt % both inclusive, and the ratio of contents of Co and Fe (Co/(Co+Fe)) is from 9.9 wt % to 79.5 wt % both inclusive. In such a composition range, a high energy density is obtained. The physical properties (half-width and the like) of the SnCoFeC-containing material are similar to those of the foregoing SnCoC-containing material.

Further, as other materials, a metal oxide, a polymer compound or the like may be used. The metal oxide is, for example, iron oxide, ruthenium oxide, molybdenum oxide or the like. The polymer compound is, for example, polyacetylene, polyaniline, polypyrrole or the like.

The anode active material layer 22B is formed by, for example, coating method, vapor-phase deposition method, liquid-phase deposition method, spraying method, firing method (sintering method), or a combination of two or more these methods. Coating method is a method in which, for example, a particulate anode active material is mixed with a binder or the like, the mixture is dispersed in a solvent such as an organic solvent, and the anode current collector is coated with the resultant. Examples of vapor-phase deposition methods include physical deposition method and chemical deposition method. Specifically, examples thereof include vacuum evaporation method, sputtering method, ion plating method, laser ablation method, thermal Chemical Vapor Deposition method, Chemical Vapor Deposition (CVD) method, and plasma Chemical Vapor Deposition method. Examples of liquid-phase deposition methods include electrolytic plating method and electroless plating method. Spraying method is a method in which an anode active material is sprayed in a fused state or a semi-fused state. Firing method is, for example, a method in which after the anode current collector is coated by a procedure similar to that of coating method, heat treatment is provided at temperature higher than the melting point of the binder or the like. Examples of firing methods include a known technique such as atmosphere firing method, reactive firing method, and hot press firing method.

[Separator]

The separator 23 separates the cathode 21 from the anode 22, and passes lithium ions while preventing current short circuit resulting from contact of both electrodes. The separator 23 is impregnated with a liquid electrolyte (electrolytic solution). The separator 23 is formed from, for example, a porous film made of a synthetic resin or ceramics. The separator 23 may be a laminated film composed of two or more porous films. Examples of the synthetic resin include polytetrafluoroethylene, polypropylene, and polyethylene.

Figure 3:
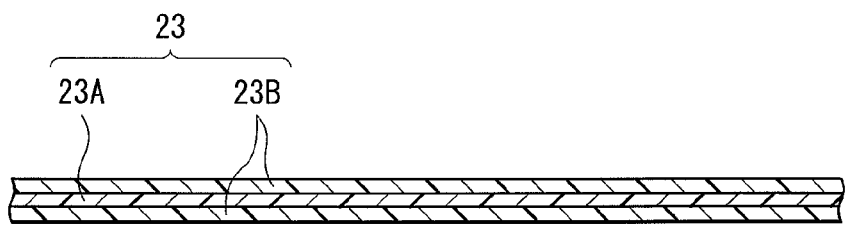
FIG. 3 is a cross sectional view illustrating a configuration of a separator.

In particular, the separator 23 may have a multilayer structure. FIG. 3 illustrates a cross sectional configuration of the separator 23, which corresponds to FIG. 2. For example, as illustrated in FIG. 3, the separator 23 having a multilayer structure preferably includes a base material layer 23A composed of the foregoing porous film and a polymer compound layer 23B provided on one or both surfaces of the base material layer 23A. Thereby, contact characteristics between the cathode 21/the anode 22 and the separator 23 are improved, and distortion of the spirally wound electrode body 20 is suppressed, and accordingly decomposition reaction of the electrolytic solution is more inhibited. Further, leakage of the electrolytic solution with which the base material 23A is impregnated is suppressed. Thereby, even if charge and discharge are repeated, resistance of the secondary battery is less likely to be increased, and battery swollenness is suppressed.

The polymer compound layer 23B contains, for example, a polymer material such as polyvinylidene fluoride, since the polymer material has superior physical strength and is electrochemically stable. However, the polymer material may be a material other than polyvinylidene fluoride. For example, the polymer compound layer 23B is formed by preparing a solution in which a polymer material is dissolved, coating the surface of the base material 23A with the solution or soaking the base material 23A in the solution, and subsequently drying the resultant.

[Electrolytic Solution/Cyclic Disulfonic Acid Anhydride]

The electrolytic solution contains one or more of cyclic disulfonic acid anhydrides expressed by the following Formula 4 and Formula 5 (hereinafter simply referred to as "cyclic disulfonic acid anhydride" as well) together with a solvent and an electrolyte salt. However, the electrolytic solution may contain other material such as various additives according to needs.

Formula 4

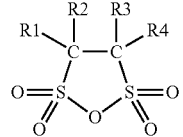

(4)

In the formula, R1 to R4 are an alkyl group ($C_mH_{2m+1}$: m satisfies $0 \leq m \leq 4$).

Formula 5

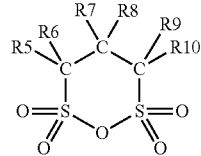

(5)

In the formula, R5 to R10 are an alkyl group ($C_nH_{2n+1}$: n satisfies $0 \leq n \leq 4$).

The cyclic disulfonic acid anhydride is a cyclic compound having —S(=O)$_2$—O—S(=O)$_2$—. The reason why the electrolytic solution contains the cyclic disulfonic acid anhydride is that thereby a protective film containing the cyclic disulfonic acid lithium is formed on the surface of the cathode 21. Thereby, even if a lithium compound providing a high capacity is used as a cathode active material, decomposition reaction of the electrolytic solution resulting from reactivity of the cathode 21 is suppressed. Therefore, even if charge and discharge are repeated, resistance of the cathode 21 is less likely to be increased.

R1 to R4 in Formula 4 are an alkyl group with a carbon number equal to or smaller than 4, and are more specifically a methyl group, an ethyl group, a propyl group, or a butyl group. However, the propyl group and the butyl group may be in a straight chain state or a branched state. Further, R1 to R4 may be the same type of group, or may be a different type of group. Given two of R1 to R4 may form a ring by being bonded to each other. The same is applied to R5 to R10 in Formula 5.

Specific examples of the cyclic disulfonic acid anhydride shown in Formula 4 include 1,2-ethanedisulfonic acid anhydride and 1,2-benzenedisulfonic acid anhydride. Specific examples of the cyclic disulfonic acid anhydride shown in Formula 5 include 1,3-propanedisulfonic acid anhydride. However, other compound may be used as long as the conditions of the chemical formulas shown in Formula 4 and formula 5 are satisfied.

Though the content of the cyclic disulfonic acid anhydride in the electrolytic solution is not particularly limited, in particular, the content thereof is preferably from 0.1 wt % to 5 wt % both inclusive, since thereby resistance rise of the cathode 21 is suppressed without largely decreasing the battery capacity and the like.

[Solvent]

For example, the solvent contains one or more of nonaqueous solvents such as the following organic solvents. Examples of the organic solvents include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, and tetrahydrofuran. Further examples thereof include 2-methyltetrahydrofuran, tetrahydropyran, 1,3-dioxolane, 4-methyl-1,3-dioxolane, 1,3-dioxane, and 1,4-dioxane. Furthermore, examples thereof include methyl acetate, ethyl acetate, methylpropionate, ethylpropionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide, N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide. By using such a compound, superior battery capacity, superior cycle characteristics, superior storage characteristics and the like are able to be obtained.

Specially, one or more of ethylene carbonate, propylene carbonate, dimethyl carbonate, diethyl carbonate, and ethyl methyl carbonate is preferable, since thereby superior characteristics are able to be obtained. In this case, a combination of a high viscosity (high dielectric constant) solvent (for example, specific inductive ∈≥30) such as ethylene carbonate as a cyclic ester carbonate and a low viscosity solvent (for example, viscosity≤1 mPa·s) such as dimethyl carbonate as a chain ester carbonate is more preferable. Thereby, dissociation property of the electrolyte salt and ion mobility are improved.

The electrolytic solution preferably contains propylene carbonate as a high viscosity solvent (cyclic ester carbonate) as a solvent. Reactivity of propylene carbonate is lower than that of ethylene carbonate, and therefore decomposition reaction of the electrolytic solution is thereby suppressed.

In particular, the solvent preferably contains halogenated cyclic ester carbonates expressed by the following Formula 6 or unsaturated carbon bond cyclic ester carbonates expressed by the following Formula 7 or both.

Formula 6

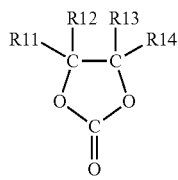

(6)

In the formula, R11 to R14 are a hydrogen group, a halogen group, an alkyl group ($C_pH_{2p+1}$: p satisfies 0≤p≤4), or a halogenated alkyl group ($C_qH_{2q+1}X_r$: X is a halogen, and q satisfies 0≤q≤4, and r satisfies 0≤r≤2q+1). One or more of R11 to R14 is a halogen group or a halogenated alkyl group.

Formula 7

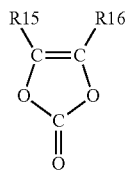

(7)

In the formula, R15 and R16 are an alkyl group ($C_sH_{2s+1}$: s satisfies 0≤s≤4).

The halogenated cyclic ester carbonate illustrated in Formula 6 is a cyclic ester carbonate containing one or more halogens as an element. The reason why the solvent contains the halogenated cyclic ester carbonate is that thereby a stable protective film is formed on the surface of the anode 22 at the time of charge and discharge, and therefore decomposition reaction of the electrolytic solution is suppressed. Thereby, even if charge and discharge are repeated, resistance of the anode 22 is further less likely to be increased. Though halogen type is not particularly limited, specially, F, Cl, or Br is preferable, and F is more preferable, since thereby higher effect is obtained. However, the number of halogens is preferably 2 than 1, and may be equal to or greater than 3, since thereby more rigid and more stable protective film is formed, and therefore decomposition reaction of the electrolytic solution is more suppressed.

R11 to R14 in Formula 6 are a hydrogen group, a halogen group, an alkyl group with a carbon number equal to or smaller than 4, or a halogenated alkyl group with a carbon number equal to or smaller 4. The halogenated alkyl group is a group obtained by substituting at least partial hydrogen group of an alkyl group with a halogen group. However, one or more of R11 to R14 is a halogen group or a halogenated alkyl group. Further, R11 to R14 may be the same type of group, or may be a different type of group.

Specific examples of the halogenated cyclic ester carbonate include 4-fluoro-1,3-dioxolane-2-one and 4,5-difluoro-1,3-dioxolane-2-one. The halogenated cyclic ester carbonate may be used singly, or a mixture of two or more thereof may be used, since thereby higher effect is obtained. However, other compound may be used as long as the conditions of the chemical formula shown in Formula 6 are satisfied. Though the content of the halogenated cyclic ester carbonate in the solvent is not particularly limited, for example, the content thereof is from 0.01 wt % to 50 wt % both inclusive, since thereby decomposition reaction of the electrolytic solution is inhibited without decreasing the battery capacity and the like.

The unsaturated carbon bond cyclic ester carbonate illustrated in Formula 7 is a cyclic ester carbonate having one or more unsaturated carbon bonds (carbon-carbon double bond). This is because a stable protective film is thereby formed on the surface of the anode 22 at the time of charge and discharge, and therefore decomposition reaction of the electrolytic solution is inhibited. Thereby, even if charge and discharge are repeated, resistance of the anode 22 is further less likely to be increased.

Specific examples of the unsaturated carbon bond cyclic ester carbonate include vinylene carbonate and vinylethylene carbonate. The unsaturated carbon bond cyclic ester carbonate may be used singly, or a mixture of two or more thereof may be used. However, other compound may be used as long as the conditions of the chemical formula shown in Formula 7 are satisfied. Though the content of the unsaturated carbon bond cyclic ester carbonate in the solvent is not particularly limited, for example, the content thereof is from 0.01 wt % to 10 wt % both inclusive, since thereby decomposition reaction of the electrolytic solution is inhibited without decreasing the battery capacity and the like.

Further, the solvent preferably contains a carboxylate ester expressed by the following Formula 8 for the following reason. That is, a stable protective film is thereby formed on the surface of the anode 22 at the time of charge and discharge, and therefore decomposition reaction of the electrolytic solution is inhibited. Further, since the viscosity of carboxylate esters is lower than that of ester carbonates, conductivity of the electrolytic solution is improved. Further, since the melting point of carboxylate esters is lower than that of ester carbonates, low temperature characteristics are thereby improved. That is, even if charge and discharge are repeated in low temperature atmosphere (for example, 0 deg C. or the like), the discharge capacity is less likely to be decreased.

Formula 8

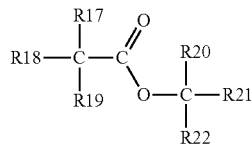

(8)

In the formula, R17 to R22 are an alkyl group ($C_tH_{2t+1}$: t satisfies $0 \leq t \leq 4$).

R17 to R22 in Formula 8 are an alkyl group with a carbon number equal to or smaller than 4. R17 to R22 may be the same type of group, or may be a different type of group. Specific examples of the carboxylate ester include ethyl acetate, methyl propionate, and methyl acetate. The carboxylate ester may be used singly, or a mixture of two or more thereof may be used. However, other compound may be used as long as the conditions of the chemical formula shown in Formula 8 are satisfied. Though the content of the carboxylate ester in the solvent is not particularly limited, for example, the content thereof is from 5 wt % to 50 wt % both inclusive, since thereby higher effect is obtained without decreasing the battery capacity and the like.

In addition, the solvent may contain a halogenated chain ester carbonate, since thereby decomposition reaction of the electrolytic solution is inhibited by a protective film formed on the surface of the anode 22 at the time of charge and discharge as in the halogenated cyclic ester carbonate. The halogenated chain ester carbonate is a chain ester carbonate containing one or more halogens as an element. The type and the number of halogens are similar to those of the halogenated cyclic ester carbonate. Specific examples of the halogenated chain ester carbonate include fluoromethyl methyl carbonate, bis(fluoromethyl) carbonate, and difluoromethyl methyl carbonate. The halogenated chain ester carbonate may be used singly, or a mixture of two or more thereof may be used. Though the content of the halogenated chain ester carbonate in the solvent is not particularly limited, for example, the content thereof is from 0.01 wt % to 50 wt % both inclusive, since thereby decomposition reaction of the electrolytic solution is inhibited without decreasing the battery capacity and the like.

Further, the solvent may contain sultone (cyclic sulfonic ester), since thereby the chemical stability of the electrolytic solution is improved. Examples of the sultone include propane sultone and propene sultone. The sultone content in the nonaqueous solvent is, for example, from 0.5 wt % to 5 wt % both inclusive, since thereby decomposition reaction of the electrolytic solution is inhibited without decreasing the battery capacity and the like.

Further, the solvent may contain an acid anhydride, since the chemical stability of the electrolytic solution is thereby further improved. Examples of the acid anhydride include a dicarboxylic acid anhydride, a disulfonic acid anhydride, and a carboxylic acid sulfonic acid anhydride. Examples of the dicarboxylic acid anhydride include succinic anhydride, glutaric anhydride, and maleic anhydride. Examples of the disulfonic acid anhydride include anhydrous ethanedisulfonate and anhydrous propanedisulfonic acid. Examples of the carboxylic acid sulfonic acid anhydride include anhydrous sulfobenzoic acid, anhydrous sulfopropionic acid, and anhydrous sulfobutyric acid. The content of the acid anhydride in the nonaqueous solvent is, for example, from 0.5 wt % to 5 wt % both inclusive since thereby decomposition reaction of the electrolytic solution is inhibited without decreasing the battery capacity and the like.

[Electrolyte Salt]

The electrolyte salt contains, for example, one or more of lithium salts. However, the electrolyte salt may contain a salt other than the lithium salt (for example, a light metal salt other than the lithium salt).

Examples of the lithium salt include $LiPF_6$, $LiBF_4$, $LiClO_4$, $LiAsF_6$, $LiB(C_6H_5)_4$, $LiCH_3SO_3$, $LiCF_3SO_3$, $LiAlO_4$, $Li_2SiF_6$, LiCl, and LiBr. Thereby, superior battery capacity, superior cycle characteristics, superior storage characteristics and the like are obtained.

Specially, one or more of $LiPF_6$, $LiBF_4$, and $LiClO_4$ and $LiAsF_6$ is preferable, and $LiPF_6$ is more preferable, since thereby internal resistance is lowered, and higher effect is obtained.

The content of the electrolyte salt is preferably from 0.3 mol/kg to 3.0 mol/kg both inclusive with respect to the solvent, since thereby high ion conductivity is obtained.

[Operation of Secondary Battery]

In the secondary battery, at the time of charge, for example, lithium ions extracted from the cathode 21 are inserted in the anode 22 through the electrolytic solution. Further, at the time of discharge, for example, lithium ions extracted from the anode 22 are inserted in the cathode 21 through the electrolytic solution.

[Method of Manufacturing Secondary Battery]

The secondary battery is manufactured, for example, by the following procedure.

First, the cathode 21 is formed. A cathode active material is mixed with a cathode binder, a cathode electrical conductor or the like according to needs to prepare a cathode mixture, which is subsequently dispersed in an organic solvent or the like to obtain paste cathode mixture slurry. Subsequently, both faces of the cathode current collector 21A are coated with the cathode mixture slurry, which is dried to form the cathode active material layer 21B. Subsequently, the cathode active material layer 21B is compression-molded by a rolling press machine or the like while being heated if necessary. In this case, the resultant may be compression-molded over several times.

Further, the anode 22 is formed by a procedure similar to that of the foregoing cathode 21. Specifically, an anode active material containing a titanium-containing lithium composite oxide is mixed with an anode binder, an anode electrical conductor or the like according to needs to prepare an anode mixture, which is subsequently dispersed in an organic solvent or the like to form paste anode mixture slurry. Subsequently, both faces of the anode current collector 22A are coated with the anode mixture slurry, which is dried to form the anode active material layer 22B. After that, the anode active material layer 22B is compression-molded according to needs.

Next, a solvent and a cyclic disulfonic acid anhydride are mixed. After that, an electrolyte salt is dissolved in the mixture to prepare an electrolytic solution.

Finally, the secondary battery is assembled by using the cathode 21 and the anode 22. First, the cathode lead 25 is attached to the cathode current collector 21A by welding method or the like, and the anode lead 26 is attached to the anode current collector 22A by welding method or the like. Subsequently, the cathode 21 and the anode 22 are layered with the separator 23 in between and are spirally wound, and thereby the spirally wound electrode body 20 is formed. After that, the center pin 24 is inserted in the center of the spirally wound electrode body. In preparing the separator 23, a porous film may be used directly, or the polymer compound layer 23B may be formed on the surface of the base material 23A as a porous film. Subsequently, the spirally wound electrode body 20 is sandwiched between the pair of insulating plates 12 and 13, and is contained in the battery can 11 of the spirally wound electrode body 20. In this case, the end of the cathode lead 25 is attached to the safety valve mechanism 15 by welding method or the like, and the end of the anode lead 26 is attached to the battery can 11 by welding method or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being caulked with the gasket 17.

[Action and Effect of Secondary Battery]

According to the cylindrical type secondary battery, the anode 22 contains the titanium-containing lithium composite oxide as an anode active material, and the electrolytic solution contains the cyclic disulfonic acid anhydride. In this case, as described above, by the titanium-containing lithium composite oxide with low reactivity, decomposition reaction of the electrolytic solution resulting from reactivity of the anode 22 is inhibited. Further, the protective film is formed on the cathode 21 by the cyclic disulfonic acid anhydride. Therefore, even if the cathode 21 contains a high capacity of a lithium-containing compound as a cathode active material, decomposition reaction of the electrolytic solution resulting from reactivity of the cathode 21 is inhibited differently from a case of using a chain disulfonic acid anhydride. Therefore, even if charge and discharge are repeated, resistance of the cathode 21 and the anode 22 is less likely to be increased. Accordingly, even charge and discharge are repeated, resistance rise of the secondary battery is able to be suppressed.

The foregoing chain disulfonic acid anhydride is methanesulfonic acid anhydride ($CH_3$—S(=O)$_2$—O—S(=O)$_2$—$CH_3$) or the like. Regarding decomposition inhibition function of the electrolytic solution, as described above, there is a difference between the cyclic disulfonic acid anhydride and the chain disulfonic acid anhydride for the following reason. The cyclic disulfonic acid anhydride is able to form a protective film containing cyclic disulfonic acid lithium on the surface of the cathode 21. The protective film has the nature of low solubility in the electrolytic solution. Thereby, even if charge and discharge are repeated, the protective film is easily retained. Therefore, due to the protective film, decomposition reaction of the electrolytic solution resulting from reactivity of the cathode 21 is less likely to be generated. Meanwhile, though the chain disulfonic acid anhydride is able to form a protective film containing lithium monosulfonate, the protective film has the nature of high solubility in the electrolytic solution. Thereby, if charge and discharge are repeated, the protective film easily disappears. Therefore, decomposition reaction of the electrolytic solution resulting from reactivity of the cathode 21 is easily generated.

In particular, in the case where the content of the cyclic disulfonic acid anhydride in the electrolytic solution is from 0.1 wt % to 5 wt % both inclusive, higher effect is able to be obtained.

Further, in the case where the solvent of the electrolytic solution contains the halogenated cyclic ester carbonate or the unsaturated carbon bond cyclic ester carbonate or both, or the solvent of the electrolytic solution contains the carboxylate ester, decomposition reaction of the electrolytic solution is more inhibited. Therefore, in this case, higher effect is able to be obtained. Such effect is similarly obtained in the case that the solvent of the electrolytic solution contains propylene carbonate as a high viscosity solvent (cyclic ester carbonate).

Further, in the case where the separator 23 includes the polymer compound layer 23B on the surface of the base material layer 23A as a porous film, decomposition reaction of the electrolytic solution is more inhibited, and therefore higher effect is able to be obtained.

<1-2. Laminated Film Type>

Figure 4:
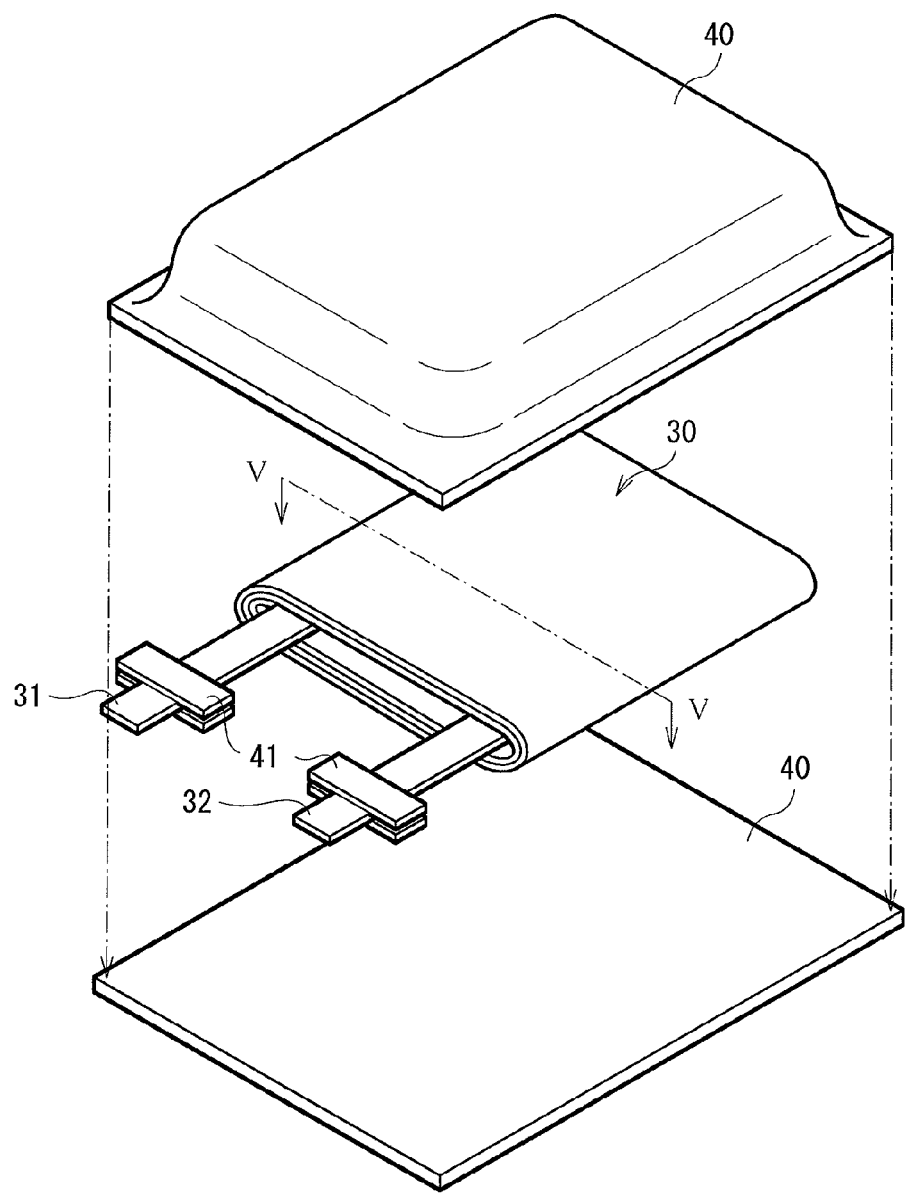
FIG. 4 is a perspective view illustrating a configuration of another secondary battery (laminated film type) of the embodiment of the present technology.
Figure 5:
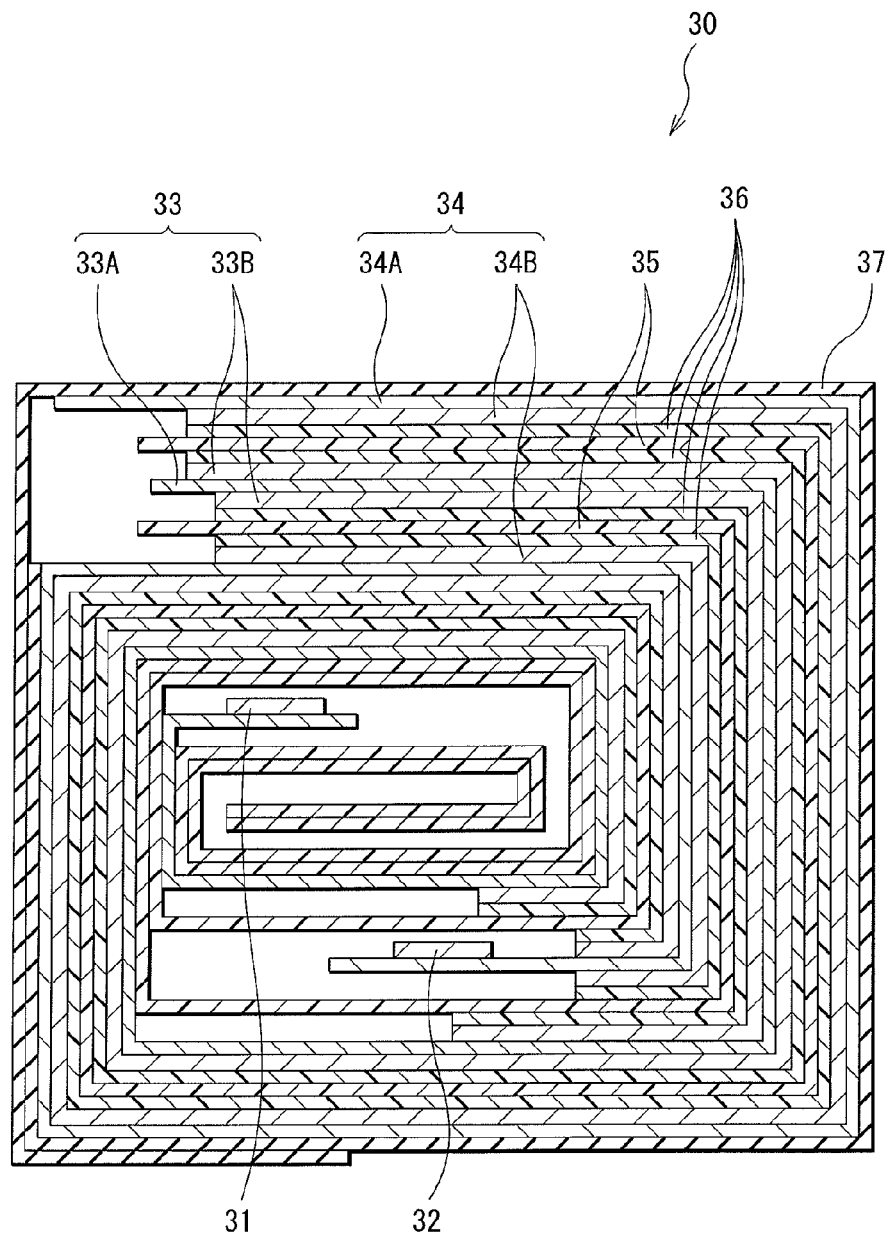
FIG. 5 is a cross sectional view taken along line V-V of the spirally wound electrode body illustrated in FIG. 4.

FIG. 4 illustrates an exploded perspective configuration of another secondary battery in the embodiment of this technology. FIG. 5 illustrates an enlarged cross section taken along line V-V of a spirally wound electrode body 30 illustrated in FIG. 4. In the following description, the elements of the cylindrical type secondary battery described above will be used as needed.

[Whole Structure of Secondary Battery]

The secondary battery herein described is what we call a laminated film type lithium ion secondary battery. In the secondary battery, the spirally wound electrode body 30 is contained in a film package member 40. In the spirally wound electrode body 30, a cathode 33 and an anode 34 are layered with a separator 35 and an electrolyte layer 36 in between and are spirally wound. A cathode lead 31 is attached to the cathode 33, and an anode lead 32 is attached to the anode 34. The outermost peripheral portion of the spirally wound electrode body 30 is protected by a protective tape 37.

The cathode lead 31 and the anode lead 32 are, for example, respectively led out from inside to outside of the package member 40 in the same direction. The cathode lead 31 is made of, for example, a conductive material such as Al, and the anode lead 32 is made of, for example, a conducive material such as Cu, Ni, and stainless steel. These materials are in the shape of, for example, a thin plate or mesh.

The package member 40 is a laminated film in which, for example, a fusion bonding layer, a metal layer, and a surface protective layer are layered in this order. In the laminated film, for example, the respective outer edges of the fusion bonding layer of two films are bonded to each other by fusion bonding, an adhesive or the like so that the fusion bonding layer and the spirally wound electrode body 30 are opposed to each other. Examples of the fusion bonding layer include a film made of polyethylene, polypropylene or the like. Examples of the metal layer include an Al foil. Examples of the surface protective layer include a film made of nylon, polyethylene terephthalate or the like.

Specially, as the package member 40, an aluminum laminated film in which a polyethylene film, an aluminum foil, and a nylon film are layered in this order is preferable. However, the package member 40 may be made of a laminated film having other laminated structure, a polymer film such as polypropylene, or a metal film.

An adhesive film 41 to protect from entering of outside air is inserted between the package member 40 and the cathode lead 31/the anode lead 32. The adhesive film 41 is made of a material having contact characteristics with respect to the cathode lead 31 and the anode lead 32. Examples of such a material include, for example, a polyolefin resin such as polyethylene, polypropylene, modified polyethylene, and modified polypropylene.

In the cathode 33, for example, a cathode active material layer 33B is provided on both faces of a cathode current collector 33A. In the anode 34, for example, an anode active material layer 34B is provided on both faces of an anode current collector 34A. The structures of the cathode current collector 33A, the cathode active material layer 33B, the anode current collector 34A, and the anode active material layer 34B are respectively similar to the structures of the cathode current collector 21A, the cathode active material layer 21B, the anode current collector 22A, and the anode active material layer 22B. Therefore, the anode active material layer 34B contains the titanium-containing lithium composite oxide as an anode active material. Further, the structure of the separator 35 is similar to the structure of the separator 23.

In the electrolyte layer 36, an electrolytic solution is held by a polymer compound. The electrolyte layer 36 may contain other material such as an additive according to needs. The electrolyte layer 36 is what we call a gel electrolyte. The gel electrolyte is preferable, since high ion conductivity (for example, 1 mS/cm or more at room temperature) is obtained and liquid leakage of the electrolytic solution is prevented.

Examples of the polymer compound include one or more of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further examples thereof include a copolymer of vinylidene fluoride and hexafluoropropylene. Specially, polyvinylidene fluoride or the copolymer of vinylidene fluoride and hexafluoropropylene is preferable, and polyvinylidene fluoride is more preferable, since such a polymer compound is electrochemically stable.

The composition of the electrolytic solution is similar to the composition of the cylindrical type secondary battery, and the electrolytic solution contains a solvent, an electrolyte salt, and a cyclic disulfonic acid anhydride. However, in the electrolyte layer 36 as the gel electrolyte, a solvent of the electrolytic solution means a wide concept including not only a liquid solvent but also a material having ion conductivity capable of dissociating the electrolyte salt. Therefore, in the case where the polymer compound having ion conductivity is used, the polymer compound is also included in the solvent.

Instead of the gel electrolyte layer 36, the electrolytic solution may be directly used. In this case, the separator 35 is impregnated with the electrolytic solution.

[Operation of Secondary Battery]

In the secondary battery, for example, at the time of charge, lithium ions extracted from the cathode 33 are inserted in the anode 34 through the electrolyte layer 36. In addition, at the time of discharge, for example, lithium ions extracted from the anode 34 are inserted in the cathode 33 through the electrolyte layer 36.

[Manufacturing Method of Secondary Battery]

The secondary battery including the gel electrolyte layer 36 is manufactured, for example, by the following three procedures.

In the first procedure, the cathode 33 and the anode 34 are formed by a formation procedure similar to that of the cathode 21 and the anode 22. In this case, the cathode 33 is formed by forming the cathode active material layer 33B on both faces of the cathode current collector 33A, and the anode 34 is formed by forming the anode active material layer 34B on both faces of the anode current collector 34A. Subsequently, a precursor solution containing an electrolytic solution, a polymer compound, an organic solvent and the like is prepared. After that, the cathode 33 and the anode 34 are coated with the precursor solution to form the gel electrolyte layer 36. Subsequently, the cathode lead 31 is attached to the cathode current collector 33A by welding method or the like and the anode lead 32 is attached to the anode current collector 34A by welding method or the like. Subsequently, the cathode 33 and the anode 34 provided with the electrolyte layer 36 are layered with the separator 35 in between and are spirally wound to form the spirally wound electrode body 30. After that, the protective tape 37 is adhered to the outermost periphery thereof. Subsequently, after the spirally wound electrode body 30 is sandwiched between two pieces of film-like package members 40, outer edges of the package members 40 are contacted by thermal fusion bonding method or the like to enclose the spirally wound electrode body 30 into the package members 40. In this case, the adhesive films 41 are inserted between the cathode lead 31, the anode lead 32 and the package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to form a spirally wound body as a precursor of the spirally wound electrode body 30. After that, the protective tape 37 is adhered to the outermost periphery thereof. Subsequently, after the spirally wound body is sandwiched between two pieces of the film-like package members 40, the outermost peripheries except for one side are bonded by thermal fusion bonding method or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the package member 40 is hermetically sealed by using thermal fusion bonding method or the like. Subsequently, the monomer is thermally polymerized. Thereby, a polymer compound is formed, and therefore the gel electrolyte layer 36 is formed.

In the third procedure, the spirally wound body is formed and contained in the pouch-like package member 40 in the same manner as that of the foregoing second procedure, except that the separator 35 with both faces coated with a polymer compound is used. Examples of the polymer compound with which the separator 35 is coated include a polymer containing vinylidene fluoride as a component (a homopolymer, a copolymer, a multicomponent copolymer or the like). Specific examples thereof include polyvinylidene fluoride, a binary copolymer containing vinylidene fluoride and hexafluoropropylene as a component, and a ternary copolymer containing vinylidene fluoride, hexafluoropropylene, and chlorotrifluoroethylene as a component. In addition to the polymer containing vinylidene fluoride as a component, other one or more polymer compounds may be used. Subsequently, an electrolytic solution is prepared and injected into the package member 40. After that, the opening of the package member 40 is sealed by thermal fusion bonding method or the like. Subsequently, the resultant is heated while a weight is applied to the package member 40, and the separator 35 is in contact with the cathode 33 and the anode 34 with the polymer compound in between. Thereby, the polymer compound is impregnated with the electrolytic solution, and accordingly the polymer compound is gelated to form the electrolyte layer 36.

In the third procedure, the swollenness of the secondary battery is suppressed compared to the first procedure. Further, in the third procedure, the monomer, the solvent and the like as a raw material of the polymer compound are hardly left in the electrolyte layer 36 compared to in the second procedure. Thus, the formation step of the polymer compound is favorably controlled. Therefore, sufficient contact characteristics are obtained between the cathode 33/the anode 34/the separator 35 and the electrolyte layer 36.

[Action and Effect of Secondary Battery]

According to the laminated film type secondary battery, the anode 34 contains the titanium-containing lithium composite oxide as an anode active material, and the electrolytic solution contains the cyclic disulfonic acid anhydride. Therefore, for the reason similar to that of the foregoing cylindrical type secondary battery, even after repeated charge and discharge, resistance rise of the secondary battery is able to be suppressed. In particular, though battery swollenness is easily generated by being affected by gas generated resulting from decomposition reaction of the electrolytic solution in the laminated film type secondary battery, such battery swollenness is able to be suppressed. The other actions and the other effects are similar to those of the cylindrical type secondary battery.

<2. Applications of Secondary Battery>

Next, a description will be given of application examples of the foregoing secondary battery.

Applications of the secondary battery are not particularly limited as long as the secondary battery is used for a machine, a device, apparatus, equipment, a system (collective entity of a plurality of devices and the like) or the like that is able to use the secondary battery as a drive power source, an electric power storage source for electric power storage or the like. In the case where the secondary battery is used as a power source, the secondary battery may be used as a main power source (power source used preferentially), or an auxiliary power source (power source used instead of a main power source or used being switched from the main power source). In the latter case, the main power source is not limited to the secondary battery.

Examples of applications of the secondary battery include electronic devices such as a video camera, a digital still camera, a mobile phone, a notebook personal computer, a cordless phone, a headphone stereo, a portable radio, a portable television, and a Personal Digital Assistant (PDA). Examples of the electronic devices include a lifestyle electric appliance such as an electric shaver; a memory device such as a backup power source and a memory card; and a medical electronic device such as a pacemaker and a hearing aid. Examples of applications of the secondary battery further include an electric power tool such as an electric drill and an electric saw; an electrical vehicle such as an electric automobile (including a hybrid car); and an electric power storage system such as a home battery system for storing electric power for emergency or the like.

Specially, the secondary battery is effectively applicable to the electronic device, the electric power tool, the electrical vehicle, the electric power storage system or the like. In these applications, since superior characteristics of the secondary battery are demanded, the characteristics are able to be effectively improved by using the secondary battery of the present technology. The electronic device executes various functions (music replay or the like) by using a secondary battery as a working electric power source. The electric power tool is a tool in which a moving part (for example, a drill or the like) is moved by using a secondary battery as a driving power source. The electrical vehicle is a vehicle that acts (runs) by using a secondary battery as a driving power source. As described above, an automobile including a drive source other than a secondary battery (hybrid vehicle or the like) may be adopted. The electric power storage system is a system using a secondary battery as an electric power storage source. For example, in a home electric power storage system, electric power is stored in the secondary battery as an electric power storage source, and the electric power stored in the secondary battery is consumed according to needs. In the result, various devices such as home electric products become operational.

EXAMPLES

Specific examples of the present technology will be described in detail.

Examples 1-1 to 1-23

The laminated film type secondary batteries illustrated in FIG. 4 and FIG. 5 were fabricated by the following procedure. After that, resistance characteristics of the secondary batteries were examined, and the results illustrated in Table 1 and Table 2 were obtained.

In forming the cathode 33, 94 parts by mass of a cathode active material (lithium-containing compound), 3 parts by mass of a cathode binder (polyvinylidene fluoride: PVDF), and 3 parts by mass of a cathode electrical conductor (amorphous carbon) were mixed to obtain a cathode mixture. As the lithium-containing compound, the materials illustrated in Table 1 and Table 2 were used. Subsequently, the cathode mixture was dispersed in an organic solvent (N-methyl-2-pyrrolidone (NMP)) to obtain cathode mixture slurry. Subsequently, both faces of the cathode current collector 33A (Al foil, thickness: 15 µm) were coated with the cathode mixture slurry, which was dried to form the cathode active material layer 33B (thickness of a single side: 75 μm). After that, the cathode current collector 33A on which the cathode active material layer 33B was formed was cut in the shape of a strip (60 mm wide, 80 mm long).

In forming the anode 34, 96 parts by mass of an anode active material (titanium-containing lithium composite oxide), 3 parts by mass of an anode binder (PVDF), and 1 part by mass of an anode electrical conductor (amorphous carbon) were mixed to obtain an anode mixture. In addition, 97 parts by mass of an anode active material (carbon material) and 3 parts by mass of an anode binder (PVDF) were mixed to obtain an anode mixture. Types of the titanium-containing lithium composite oxide are as illustrated in Table 1 and Table 2. As the carbon material (C), amorphous carbon was used. "$Li_4Ti_5O_{12}$+C coating" means that the surface of titanium-containing lithium composite oxide particles ($Li_4Ti_5O_{12}$) are coated with carbon by using CVD method. Subsequently, the anode mixture was dispersed in an organic solvent (NMP) to obtain anode mixture slurry. Subsequently, both surfaces of the anode current collector 34A were coated with the anode mixture slurry, which was dried to form the anode active material layer 34B (thickness of a single side: 100 μm). As the anode current collector 34A, an Al foil (thickness: 15 μm) was used in the case where the titanium-containing lithium composite oxide was used, and a Cu foil (thickness: 15 μm) was used in the case where the carbon material was used. After that, the anode current collector 34A on which the anode active material layer 34B was formed was cut in the shape of a strip (60 mm wide, 80 mm long).

In preparing an electrolytic solution, a disulfonic acid anhydride and a carboxylate ester were mixed as needed together with a solvent and an electrolyte salt ($LiPF_6$). As a solvent, together with ethylene carbonate (EC), propylene carbonate (PC), dimethyl carbonate (DMC), and ethylmethyl carbonate (EMC), vinylene carbonate (VC) or 4-fluoro-1,3-dioxolane-2-one (FEC) was used according to needs. As composition of the electrolytic solution, based on EC/PC:DMC:EMC:$LiPF_6$=34:25:25:16 (weight ratio), part of EC or PC was substituted with VC or FEC, and part of EMC was substituted with disulfonic acid anhydride or carboxylate ester. As the disulfonic acid anhydride, 1,3-propane disulfonic acid anhydride (PSAH) or 1,2-ethane disulfonic acid anhydride (ESAH) as a cyclic disulfonic acid anhydride or methane sulfonic acid anhydride (MSHA) as a chain disulfonic acid anhydride was used. As the carboxylate ester, ethyl acetate (EA) or methyl propionate (MP) was used. Contents of the disulfonic acid anhydride were as illustrated in Table 1 and Table 2.

In assembling the secondary battery, the cathode lead 31 made of Al was welded to one end of the cathode current collector 33A, and the anode lead 32 made of Ni was welded to one end of the anode current collector 34A. Subsequently, the cathode 33, the separator 35 (microporous polyethylene film as a porous film, thickness: 16 nm), the anode 34, and the separator 35 were layered in this order (the number of laminated layers of the cathode 33 was 5, and the number of laminated layers of the anode 34 was 6). Subsequently, the laminated body was spirally wound in the longitudinal direction to form a spirally wound body as a precursor of the spirally wound electrode body 30. After that, the winding end thereof was fixed by the protective tape 37 (adhesive tape). Subsequently, after the spirally wound body was sandwiched between the package members 40, the outermost peripheries except for one side were bonded by thermal fusion bonding to obtain a pouched state, and the spirally wound body was contained in the pouch-like package member 40. As the package member 40, an aluminum laminated film in which a nylon film (thickness: 30 μm), an aluminum foil (thickness: 40 μm), and a cast polypropylene film (thickness: 30 μm) were layered from outside was used. Subsequently, 4 g of the electrolytic solution was injected into an opening of the package member 40, the separator 35 was impregnated with the electrolytic solution, and thereby the spirally wound electrode body 30 was formed. Finally, the opening of the package member 40 was sealed by thermal fusion bonding in the vacuum atmosphere. Thereby, the secondary battery was completed.

In examining resistance characteristics, after resistance of the secondary battery was measured, the secondary battery was charged and discharged (500 cycles) in the atmosphere at 23 deg C., and resistance of the secondary battery was measured again. Based on the measurement results, resistance rise ratio (%)=[(resistance after charge and discharge−resistance before charge and discharge)/resistance before charge and discharge]*100 was calculated. As charge and discharge conditions, after charge was performed for 2 hours at a current of 1400 mA with the upper limit voltage of 2.7 V, discharge was performed at a current of 1400 mA with the lower limit voltage of 1.8 V.

TABLE 1

Separator: Porous film

| | | | | Electrolytic solution | | | | |
| | | | | | Disulfonic acid anhydride | | Other solvent | | Resistance rise ratio (%) |
| Table 1 | Cathode active material | Anode active material | Solvent | Type | Content (wt %) | Type | Content (wt %) | |
|---|---|---|---|---|---|---|---|---|
| Example 1-1 | $LiNi_{0.5}Co_{0.2}Mn_{0.3}O_2$ | $Li_4Ti_5O_{12}$ | EC + DMC + EMC | PSAH | 1 | — | — | 92 |
| Example 1-2 | $LiNi_{0.5}Co_{0.2}Mn_{0.3}O_2$ | $Li_4Ti_5O_{12}$ | PC + DMC + EMC | PSAH | 1 | — | — | 89 |
| Example 1-3 | $LiNi_{0.5}Co_{0.2}Mn_{0.3}O_2$ | $Li_4Ti_5O_{12}$ | PC + DMC + EMC | ESAH | 1 | — | — | 100 |
| Example 1-4 | $LiNi_{0.5}Co_{0.2}Mn_{0.3}O_2$ | $Li_4Ti_5O_{12}$ | PC + DMC + EMC | PSAH | 0.1 | VC | 1 | 100 |
| Example 1-5 | $LiNi_{0.5}Co_{0.2}Mn_{0.3}O_2$ | $Li_4Ti_5O_{12}$ | PC + DMC + EMC | PSAH | 1 | VC | 1 | 84 |
| Example 1-6 | $LiNi_{0.5}Co_{0.2}Mn_{0.3}O_2$ | $Li_4Ti_5O_{12}$ | PC + DMC + EMC | PSAH | 5 | VC | 1 | 82 |
| Example 1-7 | $LiNi_{0.5}Co_{0.2}Mn_{0.3}O_2$ | $Li_4Ti_5O_{12}$ | PC + DMC + EMC | PSAH | 1 | VC | 0.1 | 91 |
| Example 1-8 | $LiNi_{0.5}Co_{0.2}Mn_{0.3}O_2$ | $Li_4Ti_5O_{12}$ | PC + DMC + EMC | PSAH | 1 | VC | 5 | 83 |
| Example 1-9 | $LiNi_{0.77}Co_{0.2}Mn_{0.03}O_2$ | $Li_4Ti_5O_{12}$ | PC + DMC + EMC | PSAH | 1 | VC | 1 | 87 |
| Example 1-10 | $LiMn_2O_4$ | $Li_4Ti_5O_{12}$ | PC + DMC + EMC | PSAH | 1 | VC | 1 | 83 |

TABLE 1-continued

Separator: Porous film

| Table 1 | Cathode active material | Anode active material | Solvent | Disulfonic acid anhydride Type | Content (wt %) | Other solvent Type | Content (wt %) | Resistance rise ratio (%) |
|---|---|---|---|---|---|---|---|---|
| Example 1-11 | $LiNi_{0.5}Co_{0.2}Mn_{0.3}O_2$ | $Li_4Ti_{4.95}Nb_{0.05}O_{12}$ | PC + DMC + EMC | PSAH | 1 | VC | 1 | 84 |
| Example 1-12 | $LiNi_{0.5}Co_{0.2}Mn_{0.3}O_2$ | $Li_{3.75}Ti_{4.875}Mg_{0.375}O_{12}$ | PC + DMC + EMC | PSAH | 1 | VC | 1 | 83 |
| Example 1-13 | $LiNi_{0.5}Co_{0.2}Mn_{0.3}O_2$ | $Li_4Ti_5O_{12}$ + C coating | PC + DMC + EMC | PSAH | 1 | VC | 1 | 82 |

TABLE 2

Separator: Porous film

| Table 2 | Cathode active material | Anode active material | Solvent | Disulfonic acid anhydride Type | Content (wt %) | Other solvent Type | Content (wt %) | Resistance rise ratio (%) |
|---|---|---|---|---|---|---|---|---|
| Example 1-14 | $LiNi_{0.5}Co_{0.2}Mn_{0.3}O_2$ | $Li_4Ti_5O_{12}$ | PC + DMC + EA | PSAH | 1 | VC | 1 | 97 |
| Example 1-15 | $LiNi_{0.5}Co_{0.2}Mn_{0.3}O_2$ | $Li_4Ti_5O_{12}$ | PC + DMC + MP | PSAH | 1 | VC | 1 | 95 |
| Example 1-16 | $LiNi_{0.5}Co_{0.2}Mn_{0.3}O_2$ | $Li_4Ti_5O_{12}$ | PC + DMC + EMC | PSAH | 1 | FEC | 1 | 86 |
| Example 1-17 | $LiNi_{0.5}Co_{0.2}Mn_{0.3}O_2$ | C | PC + DMC + EMC | — | — | — | — | 217 |
| Example 1-18 | $LiNi_{0.5}Co_{0.2}Mn_{0.3}O_2$ | $Li_4Ti_5O_{12}$ | PC + DMC + EMC | — | — | — | — | 147 |
| Example 1-19 | $LiNi_{0.5}Co_{0.2}Mn_{0.3}O_2$ | C | PC + DMC + EMC | PSAH | 1 | — | — | 159 |
| Example 1-20 | $LiNi_{0.5}Co_{0.2}Mn_{0.3}O_2$ | $Li_4Ti_5O_{12}$ | PC + DMC + EMC | MSAH | 1 | — | — | 141 |
| Example 1-21 | $LiNi_{0.77}Co_{0.2}Mn_{0.03}O_2$ | $Li_4Ti_5O_{12}$ | PC + DMC + EMC | PSAH | 1 | — | — | 153 |
| Example 1-22 | $LiMn_2O_4$ | $Li_4Ti_5O_{12}$ | PC + DMC + EMC | PSAH | 1 | — | — | 145 |
| Example 1-23 | $LiNi_{0.5}Co_{0.2}Mn_{0.3}O_2$ | $Li_4Ti_{4.95}Nb_{0.05}O_{12}$ | PC + DMC + EMC | — | — | — | — | 146 |

In the case where the anode active material was a carbon material (amorphous carbon), the resistance rise ratio was high without relation to whether or not the electrolytic solution contained the cyclic disulfonic acid anhydride (PSAH or the like). Meanwhile, in the case where the anode active material was a titanium-containing lithium composite oxide ($Li_4Ti_5O_{12}$ or the like), if the electrolytic solution contained the cyclic disulfonic acid anhydride, the resistance rise ratio was remarkably low.

In the case where the titanium-containing lithium composite oxide was used, if the chain disulfonic acid anhydride (MSAH) was used as a disulfonic acid anhydride contained in the electrolytic solution, the resistance rise ratio was high. Meanwhile, in the case where the cyclic disulfonic acid anhydride (PSAH or the like) was used, the resistance rise ratio was remarkably low.

In particular, in the case where the electrolytic solution contained the cyclic ester carbonate (PC), the unsaturated carbon bond cyclic ester carbonate (VC), or the halogenated cyclic ester carbonate (FEC), resistance rise ratio became lower.

Examples 2-1 to 2-23

Secondary batteries were fabricated by a procedure similar to that of Examples 1-1 to 1-23, except that the configuration of the separator 35 was changed, and resistance characteristics were examined. Accordingly, the results illustrated in Table 3 and Table 4 were obtained.

As the separator 35, a separator in which polymer compound layers (PVDF: thickness of a single side: 2 μm) were formed on both faces of a base material layer (microporous polyethylene film as a porous film, thickness: 12 μm) was used. In forming the polymer compound layer, a solution in which PVDF was dissolved in NMP was prepared, and both faces of the base material layer were coated with the solution, which was dried.

TABLE 3

Separator: Polymer compound layer/base material layer (porous film)/polymer compound layer

| Table 3 | Cathode active material | Anode active material | Solvent | Electrolytic solution | | | | Resistance rise ratio (%) |
|---|---|---|---|---|---|---|---|---|
| | | | | Disulfonic acid anhydride | | Other solvent | | |
| | | | | Type | Content (wt %) | Type | Content (wt %) | |
| Example 2-1 | $LiNi_{0.5}Co_{0.2}Mn_{0.3}O_2$ | $Li_4Ti_5O_{12}$ | EC + DMC + EMC | PSAH | 1 | — | — | 88 |
| Example 2-2 | $LiNi_{0.5}Co_{0.2}Mn_{0.3}O_2$ | $Li_4Ti_5O_{12}$ | PC + DMC + EMC | PSAH | 1 | — | — | 85 |
| Example 2-3 | $LiNi_{0.5}Co_{0.2}Mn_{0.3}O_2$ | $Li_4Ti_5O_{12}$ | PC + DMC + EMC | ESAH | 1 | — | — | 95 |
| Example 2-4 | $LiNi_{0.5}Co_{0.2}Mn_{0.3}O_2$ | $Li_4Ti_5O_{12}$ | PC + DMC + EMC | PSAH | 0.1 | VC | 1 | 95 |
| Example 2-5 | $LiNi_{0.5}Co_{0.2}Mn_{0.3}O_2$ | $Li_4Ti_5O_{12}$ | PC + DMC + EMC | PSAH | 1 | VC | 1 | 80 |
| Example 2-6 | $LiNi_{0.5}Co_{0.2}Mn_{0.3}O_2$ | $Li_4Ti_5O_{12}$ | PC + DMC + EMC | PSAH | 5 | VC | 1 | 78 |
| Example 2-7 | $LiNi_{0.5}Co_{0.2}Mn_{0.3}O_2$ | $Li_4Ti_5O_{12}$ | PC + DMC + EMC | PSAH | 1 | VC | 0.1 | 87 |
| Example 2-8 | $LiNi_{0.5}Co_{0.2}Mn_{0.3}O_2$ | $Li_4Ti_5O_{12}$ | PC + DMC + EMC | PSAH | 1 | VC | 5 | 79 |
| Example 2-9 | $LiNi_{0.77}Co_{0.2}Mn_{0.03}O_2$ | $Li_4Ti_5O_{12}$ | PC + DMC + EMC | PSAH | 1 | VC | 1 | 83 |
| Example 2-10 | $LiMn_2O_4$ | $Li_4Ti_5O_{12}$ | PC + DMC + EMC | PSAH | 1 | VC | 1 | 79 |
| Example 2-11 | $LiNi_{0.5}Co_{0.2}Mn_{0.3}O_2$ | $Li_4Ti_{4.95}Nb_{0.05}O_{12}$ | PC + DMC + EMC | PSAH | 1 | VC | 1 | 80 |
| Example 2-12 | $LiNi_{0.5}Co_{0.2}Mn_{0.3}O_2$ | $Li_{3.75}Ti_{4.875}Mg_{0.375}O_{12}$ | PC + DMC + EMC | PSAH | 1 | VC | 1 | 79 |
| Example 2-13 | $LiNi_{0.5}Co_{0.2}Mn_{0.3}O_2$ | $Li_4Ti_5O_{12}$ + C coating | PC + DMC + EMC | PSAH | 1 | VC | 1 | 78 |

TABLE 4

Separator: Polymer compound layer/base material layer (porous film)/polymer compound layer

| Table 4 | Cathode active material | Anode active material | Solvent | Electrolytic solution | | | | Resistance rise ratio (%) |
|---|---|---|---|---|---|---|---|---|
| | | | | Disulfonic acid anhydride | | Other solvent | | |
| | | | | Type | Content (wt %) | Type | Content (wt %) | |
| Example 2-14 | $LiNi_{0.5}Co_{0.2}Mn_{0.3}O_2$ | $Li_4Ti_5O_{12}$ | PC + DMC + EA | PSAH | 1 | VC | 1 | 92 |
| Example 2-15 | $LiNi_{0.5}Co_{0.2}Mn_{0.3}O_2$ | $Li_4Ti_5O_{12}$ | PC + DMC + MP | PSAH | 1 | VC | 1 | 90 |
| Example 2-16 | $LiNi_{0.5}Co_{0.2}Mn_{0.3}O_2$ | $Li_4Ti_5O_{12}$ | PC + DMC + EMC | PSAH | 1 | FEC | 1 | 82 |
| Example 2-17 | $LiNi_{0.5}Co_{0.2}Mn_{0.3}O_2$ | C | PC + DMC + EMC | — | — | — | — | 206 |
| Example 2-18 | $LiNi_{0.5}Co_{0.2}Mn_{0.3}O_2$ | $Li_4Ti_5O_{12}$ | PC + DMC + EMC | — | — | — | — | 140 |
| Example 2-19 | $LiNi_{0.5}Co_{0.2}Mn_{0.3}O_2$ | C | PC + DMC + EMC | PSAH | 1 | — | — | 151 |
| Example 2-20 | $LiNi_{0.5}Co_{0.2}Mn_{0.3}O_2$ | $Li_4Ti_5O_{12}$ | PC + DMC + EMC | MSAH | 1 | — | — | 134 |
| Example 2-21 | $LiNi_{0.77}Co_{0.2}Mn_{0.03}O_2$ | $Li_4Ti_5O_{12}$ | PC + DMC + EMC | PSAH | 1 | — | — | 146 |
| Example 2-22 | $LiMn_2O_4$ | $Li_4Ti_5O_{12}$ | PC + DMC + EMC | PSAH | 1 | — | — | 138 |
| Example 2-23 | $LiNi_{0.5}Co_{0.2}Mn_{0.3}O_2$ | $Li_4Ti_{4.95}Nb_{0.05}O_{12}$ | PC + DMC + EMC | — | — | — | — | 139 |

Even if the structure of the separator 35 was changed, the results similar to those of Table 1 and Table 2 were obtained. That is, in the case where the anode active material was the titanium-containing lithium composite oxide, if the electrolytic solution contained the cyclic disulfonic acid anhydride, the resistance rise ratio was remarkably low. In particular, in the case where the separator 35 had the polymer compound layer, the resistance rise ratio became lower compared to the case that the separator 35 did not have the polymer compound layer (Table 1 and Table 2).

From the results of Table 1 to Table 4, it was found that in the case where the anode contained the titanium-containing lithium composite oxide as an anode active material and the electrolytic solution contained the cyclic disulfonic acid anhydride, resistance rise was able to be suppressed even if charge and discharge were repeated.

The present technology has been described with reference to the embodiment and the examples. However, the present technology is not limited to the described embodiment and the examples, and various modifications may be made. For example, the cathode active material of the present technology is similarly applicable to a lithium ion secondary battery in which the anode capacity includes the capacity by inserting and extracting lithium ions and the capacity associated with precipitation and dissolution of lithium metal, and the anode capacity is expressed by the sum of these capacities. In this case, the chargeable capacity of the anode material is set to a smaller value than that of the discharge capacity of the cathode.

Further, in the embodiment and the examples, the description has been given with the specific examples of the case in which the battery structure is the cylindrical type or the laminated film type, and with the specific example in which the battery element has the spirally wound structure. However, applicable structures are not limited thereto. The lithium ion secondary battery of the present technology is similarly applicable to a battery having other battery structure such as a coin type battery, a square type battery, and a button type battery or a battery in which the battery element has other structure such as a laminated structure.

Further, in the embodiment and the examples, for the compositions of the titanium-containing lithium composite oxide (values of x to z, m, n and the like), the description has been given of the appropriate ranges derived from the results of the examples. However, the description does not totally deny a possibility that the compositions are out of the foregoing ranges. That is, the foregoing appropriate ranges are only the ranges particularly preferable for obtaining the effects of the present technology. Therefore, as long as effect of the present technology is obtained, the compositions may be out of the foregoing ranges in some degrees.

It is possible to achieve at least the following configurations from the above-described example embodiment of the disclosure.

(1) A secondary battery including:
  a cathode;
  an anode; and
  an electrolytic solution,
  wherein the anode contains one or more of titanium-containing lithium composite oxides expressed by the following Formula 1 to Formula 3 as an anode active material, and
  the electrolytic solution contains cyclic disulfonic acid anhydride expressed by the following Formula 4 or cyclic disulfonic acid anhydride expressed by the following Formula 5 or both.

$$Li[Li_xM1_{(1-3x)/2}Ti_{(3+x)/2}]O_4 \quad \text{Formula 1}$$

where M1 is one or more of Mg, Ca, Cu, Zn, and Sr, and x satisfies $0 \leq x \leq 1/3$.

$$Li[Li_yM2_{1-3y}Ti_{1+2y}]O_4 \quad \text{Formula 2}$$

where M2 is one or more of Al, Sc, Cr, Mn, Fe, Ga, and Y, and y satisfies $0 \leq y \leq 1/3$.

$$Li[Li_{1/3}M3_zTi_{(5/3)-z}]O_4 \quad \text{Formula 3}$$

where M3 is one or more of V, Zr, and Nb, and z satisfies $0 \leq z \leq 2/3$.

Formula 4

(4)

[Chemical structure with R1, R2, R3, R4 substituents on a cyclic disulfonic acid anhydride]

where R1 to R4 are an alkyl group ($C_mH_{2m+1}$: m satisfies $0 \leq m \leq 4$).

Formula 5

(5)

[Chemical structure with R5 to R10 substituents on a six-membered cyclic disulfonic acid anhydride]

where R5 to R10 are an alkyl group ($C_nH_{2n+1}$: n satisfies $0 \leq n \leq 4$).

(2) The secondary battery according to (1), wherein the cyclic disulfonic acid anhydride is 1,2-ethanedisulfonic acid anhydride or 1,3-propanedisulfonic acid anhydride or both.

(3) The secondary battery according to (1), wherein a content of the cyclic disulfonic acid anhydride in the electrolytic solution is from 0.1 wt % to 5 wt % both inclusive.

(4) The secondary battery according to (1), wherein the electrolytic solution contains halogenated cyclic ester carbonate expressed by the following Formula 6 or unsaturated carbon bond cyclic ester carbonate expressed by the following Formula 7 or both.

Formula 6

(6)

[Chemical structure with R11, R12, R13, R14 substituents on cyclic ester carbonate]

where R11 to R14 are a hydrogen group, a halogen group, an alkyl group ($C_pH_{2p+1}$: p satisfies $0 \leq p \leq 4$), or a halogenated alkyl group ($C_qH_{2q+1}X_r$: X is a halogen, q satisfies $0 \leq q \leq 4$, and r satisfies $0 \leq r \leq 2q+1$), and one or more of R11 to R14 are a halogen group or a halogenated alkyl group.

Formula 7

(7)

[Chemical structure with R15, R16 substituents on unsaturated cyclic ester carbonate]

where R15 and R16 are an alkyl group ($C_sH_{2s+1}$: s satisfies $0 \leq s \leq 4$).

(5) The secondary battery according to (4), wherein the halogenated cyclic ester carbonate is 4-fluoro-1,3-dioxolane-2-one, and the unsaturated carbon bond cyclic ester carbonate is vinylene carbonate.

(6) The secondary battery according to (1), wherein the electrolytic solution contains propylene carbonate as a cyclic ester carbonate.

(7) The secondary battery according to (1), wherein the cathode and the anode are layered with a separator in between, and
  the separator includes a base material layer as a porous film and a polymer compound layer provided on one or both surfaces of the base material layer.

(8) The secondary battery according to (7), wherein the polymer compound layer contains polyvinylidene fluoride.

(9) The secondary battery according to (1), wherein the secondary battery is a lithium ion secondary battery.

(10) An electronic device using the secondary battery according to any one of (1) to (9).

(11) An electric power tool using the secondary battery according to any one of (1) to (9).

(12) An electrical vehicle using the secondary battery according to any one of (1) to (9).

(13) An electric power storage system using the secondary battery according to any one of (1) to (9).

The present technology contains subject matter related to that disclosed in Japanese Priority Patent Application JP 2011-63617 filed in the Japanese Patent Office on Mar. 23, 2011, the entire contents of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A secondary battery comprising:
    a cathode;
    an anode; and
    an electrolytic solution,
    wherein the anode contains one or more of titanium-containing lithium composite oxides expressed by the following Formula 1 to Formula 3 as an anode active material, and
    the electrolytic solution contains cyclic disulfonic acid anhydride expressed by the following Formula 4 or cyclic disulfonic acid anhydride expressed by the following Formula 5 or both:

$$\text{Li}[\text{Li}_x\text{M1}_{(1-3x)/2}\text{Ti}_{(3+x)/2}]\text{O}_4 \qquad \text{Formula 1}$$

where M1 is one or more of Mg, Ca, Cu, Zn, and Sr, and x satisfies $0 \leq x \leq 1/3$:

$$\text{Li}[\text{Li}_y\text{M2}_{1-3y}\text{Ti}_{1+2y}]\text{O}_4 \qquad \text{Formula 2}$$

where M2 is one or more of Al, Sc, Cr, Mn, Fe, Ga, and Y, and y satisfies $0 \leq y \leq 1/3$:

$$\text{Li}[\text{Li}_{1/3}\text{M3}_z\text{Ti}_{(5/3)-z}]\text{O}_4 \qquad \text{Formula 3}$$

where M3 is one or more of V, Zr, and Nb, and z satisfies $0 \leq z \leq 2/3$:

Formula 4

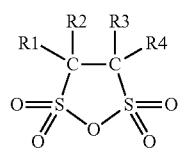
(4)

where R1 to R4 are an alkyl group ($C_mH_{2m+1}$: m satisfies $0 \leq m \leq 4$):

Formula 5

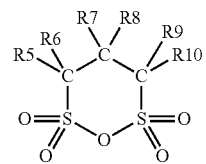
(5)

where R5 to R10 are an alkyl group ($C_nH_{2n+1}$: n satisfies $0 \leq n \leq 4$).

2. The secondary battery according to claim 1, wherein the cyclic disulfonic acid anhydride is 1,2-ethanedisulfonic acid anhydride or 1,3-propanedisulfonic acid anhydride or both.

3. The secondary battery according to claim 1, wherein a content of the cyclic disulfonic acid anhydride in the electrolytic solution is from 0.1 wt % to 5 wt % both inclusive.

4. The secondary battery according to claim 1, wherein the electrolytic solution contains halogenated cyclic ester carbonate expressed by the following Formula 6 or unsaturated carbon bond cyclic ester carbonate expressed by the following Formula 7 or both;

Formula 6

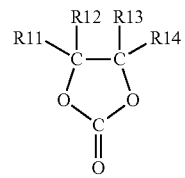
(6)

where R11 to R14 are a hydrogen group, a halogen group, an alkyl group ($C_pH_{2p+1}$: p satisfies $0 \leq p \leq 4$), or a halogenated alkyl group ($C_qH_{2q+1}X_r$: X is a halogen, q satisfies $0 \leq q \leq 4$, and r satisfies $0 \leq r \leq 2q+1$), and one or more of R11 to R14 are a halogen group or a halogenated alkyl group;

Formula 7

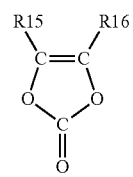
(7)

where R15 and R16 are an alkyl group ($C_sH_{2s+1}$: s satisfies $0 \leq s \leq 4$).

5. The secondary battery according to claim 4, wherein the halogenated cyclic ester carbonate is 4-fluoro-1,3-dioxolane-2-one, and the unsaturated carbon bond cyclic ester carbonate is vinylene carbonate.

6. The secondary battery according to claim 1, wherein the electrolytic solution contains propylene carbonate as a cyclic ester carbonate.

7. The secondary battery according to claim 1, wherein the cathode and the anode are layered with a separator in between, and
the separator includes a base material layer as a porous film and a polymer compound layer provided on one or both surfaces of the base material layer.

8. The secondary battery according to claim 7, wherein the polymer compound layer contains polyvinylidene fluoride.

9. The secondary battery according to claim 1, wherein the secondary battery is a lithium ion secondary battery.

10. An electronic device using the secondary battery according to claim 1.

11. An electric power tool using the secondary battery according to claim 1.

12. An electrical vehicle using the secondary battery according to claim 1.

13. An electric power storage system using the secondary battery according to claim 1.

* * * * *